(12) United States Patent
Li et al.

(10) Patent No.: US 12,497,703 B2
(45) Date of Patent: Dec. 16, 2025

(54) NICKEL-IRON CATALYTIC MATERIAL, PREPARATION METHOD THEREFOR, AND USE THEREOF IN HYDROGEN PRODUCTION THROUGH WATER ELECTROLYSIS AND PREPARATION OF LIQUID SOLAR FUEL (LSF)

(71) Applicant: DALIAN INSTITUTE OF CHEMICAL PHYSICS, CHINESE ACADEMY OF SCIENCES, Dalian (CN)

(72) Inventors: Can Li, Dalian (CN); Xiurui An, Dalian (CN); Tingting Yao, Dalian (CN); Jijie Wang, Dalian (CN)

(73) Assignee: DALIAN INSTITUTE OF CHEMICAL PHYSICS, CHINESE ACADEMY OF SCIENCES, Dalian (CN)

(*) Notice: Subject to any disclaimer, the term of this patent is extended or adjusted under 35 U.S.C. 154(b) by 936 days.

(21) Appl. No.: 17/620,135

(22) PCT Filed: Jul. 5, 2019

(86) PCT No.: PCT/CN2019/094802
§ 371 (c)(1),
(2) Date: Dec. 17, 2021

(87) PCT Pub. No.: WO2020/252820
PCT Pub. Date: Dec. 24, 2020

(65) Prior Publication Data
US 2022/0259749 A1    Aug. 18, 2022

(30) Foreign Application Priority Data
Jun. 17, 2019   (CN) .................. 201910520816.X

(51) Int. Cl.
*C25B 11/054* (2021.01)
*B01J 23/745* (2006.01)
(Continued)

(52) U.S. Cl.
CPC ........... *C25B 11/054* (2021.01); *B01J 23/745* (2013.01); *B01J 23/755* (2013.01);
(Continued)

(58) Field of Classification Search
CPC ... C25B 11/051; C25B 11/054; C25B 11/061; C25B 11/091; B01J 23/745; B01J 23/755;
(Continued)

(56) References Cited

U.S. PATENT DOCUMENTS 7,175,751 B2    2/2007   Venkatesan et al.

FOREIGN PATENT DOCUMENTS

CN     101428348 A      5/2009
CN     101822985 A  *   9/2010
(Continued)

OTHER PUBLICATIONS

CN 101822985 A machine translation (Year: 2010).*
(Continued)

*Primary Examiner* — Michael Forrest
*Assistant Examiner* — Nicole Lee Quist
(74) *Attorney, Agent, or Firm* — Bayramoglu Law Offices LLC

(57) ABSTRACT

A nickel-iron catalytic material, a preparation method thereof, and a use thereof in the hydrogen production through water electrolysis and the preparation of a liquid solar fuel (LSF) are provided. The nickel-iron catalytic material is prepared by using a soluble iron salt as a raw material and growing on a modified nickel substrate under mild conditions, and the nickel-iron catalytic material can be used in the industrial alkaline water electrolysis under harsh (Continued)

conditions. The nickel-iron catalytic material includes a nickel metal substrate and a catalytically-active layer with iron and nickel. When used to promote a water splitting reaction, the nickel-iron catalytic material can reduce the energy consumption per m³ of hydrogen production through industrial alkaline water electrolysis from 4.4 kWh to 4.01 kWh, thereby increasing the conversion of solar energy to methanol by 9.7%.

8 Claims, 5 Drawing Sheets

(51) Int. Cl.
*B01J 23/755* (2006.01)
*B01J 37/02* (2006.01)
*B01J 37/08* (2006.01)
*B01J 37/18* (2006.01)
*C07C 29/151* (2006.01)
*C25B 1/04* (2021.01)
*C25B 11/061* (2021.01)
*C25B 11/091* (2021.01)
*C25B 15/08* (2006.01)
*H02S 10/00* (2014.01)

(52) U.S. Cl.
CPC ........... *B01J 37/0215* (2013.01); *B01J 37/08* (2013.01); *B01J 37/18* (2013.01); *C07C 29/1518* (2013.01); *C25B 1/04* (2013.01); *C25B 11/061* (2021.01); *C25B 11/091* (2021.01); *C25B 15/081* (2021.01); *H02S 10/00* (2013.01)

(58) Field of Classification Search
CPC .... B01J 37/0215; B01J 37/0217; B01J 37/08; B01J 37/18
See application file for complete search history.

(56) References Cited

FOREIGN PATENT DOCUMENTS

| CN | 103055868 | A | | 4/2013 | |
|---|---|---|---|---|---|
| CN | 103460469 | A | | 12/2013 | |
| CN | 104193584 | A | | 12/2014 | |
| CN | 104253055 | A | | 12/2014 | |
| CN | 105013512 | A | | 11/2015 | |
| CN | 105420748 | A | | 3/2016 | |
| CN | 107117600 | A | | 9/2017 | |
| CN | 107123554 | A | | 9/2017 | |
| CN | 107620087 | A | | 1/2018 | |
| CN | 107930631 | A | | 4/2018 | |
| CN | 108193227 | A | | 6/2018 | |
| CN | 108283926 | A | | 7/2018 | |
| CN | 108716008 | A | | 10/2018 | |
| CN | 108754532 | A | | 11/2018 | |
| CN | 108950596 | A | | 12/2018 | |
| CN | 109225190 | A | * | 1/2019 | .......... B01J 23/8926 |
| CN | 109371420 | A | | 2/2019 | |
| CN | 109794247 | A | | 5/2019 | |
| JP | 2019505361 | A | | 2/2019 | |

OTHER PUBLICATIONS

Jean Marie Vianney Nsanzimana, "Ultrathin Amorphous Iron-Nickel Boride Nanosheets for Highly Efficient Electrocatalytic Oxygen Production", Chemistry a European Journal, 2018, 24, 18502-18511.*
P.K. de Bokx et al., "The Interaction of Oxygen with Ni(100) and the Reduction of the Surface Oxide by Hydrogen", Applications of Surface Science, 1980, 5, 321-331.*
Mary W Louie et al. "An Investigation of Thin-Film Ni—Fe Oxide Catalysts for the Electrochemical Evolution of Oxygen", Journal of the American Chemical Society, 2013, 135, 12329-12337.*
CN 109225190 A machine translation (Year: 2019).*
Liming Ren, et al., Heterostructural NiFe—LDH@Ni3S2 nanosheet arrays as an efficient electrocatalyst for overall water splitting, Electrochimica Acta, 2019, pp. 42-50, 318.
Lv Xuanzhong, et al., Elemental Biology, 2011, pp. 403-409, University of Science and Technology of China Press.
Retrieved from: https://srdata.nist.gov/xps/EngElmSrchQuery.aspx?EType=PE&CSOpt=Retri_ex_dat&Elm=Fe, 2012.

* cited by examiner

NICKEL-IRON CATALYTIC MATERIAL, PREPARATION METHOD THEREFOR, AND USE THEREOF IN HYDROGEN PRODUCTION THROUGH WATER ELECTROLYSIS AND PREPARATION OF LIQUID SOLAR FUEL (LSF)

CROSS REFERENCE TO RELATED APPLICATIONS

This application is the national phase entry of International Application No. PCT/CN2019/094802, filed on Jul. 5, 2019, which is based upon and claims priority to Chinese Patent Application No. 201910520816.X, filed on Jun. 17, 2019, the entire contents of which are incorporated herein by reference.

TECHNICAL FIELD

The present disclosure relates to the technical field of clean renewable energy utilization, and in particular to a nickel-iron catalytic material, and a preparation method and use thereof.

BACKGROUND

Due to the excessive use of fossil resources, environmental pollution and ecological environmental degradation are worsening. In particular, the emission of carbon dioxide (greenhouse gas) has led to global climate change and frequent extreme weather, which directly threatens the ecological environment of the earth that humans live on. The clean utilization of renewable energy and carbon resources has been raised to an unprecedented height.

Since methanol is produced from a reaction of carbon dioxide and water under solar energy and the solar energy is stored in methanol molecules in the form of chemical energy, methanol is referred to as solar fuel. Further, methanol generally exists in liquid form, so methanol is also referred to as liquid solar fuel (LSF). Moreover, methanol is also an important chemical intermediate, so that methanol is used as a raw material to produce high-end fuels and chemicals such as gasoline, diesel, olefins, and aromatics.

In a production process of LSF, $CO_2$ usually comes from the emission of fossil resources, and the cleanliness of a hydrogen source and the level of energy consumption for production greatly determine the cleanliness, sustainability, and cost of the LSF. At present, about 95% of the hydrogen production capacity worldwide is still derived from fossil resource reforming technology, but the fossil resource reforming technology cannot fundamentally change the energy structure and alleviate environmental pollution. Basically, there is no carbon emission in the production of hydrogen through water splitting under solar energy. At present, the industrial hydrogen production equipment based on alkaline water electrolysis has a moderate cost, and can produce $100 \, m^3$ to $1,000 \, m^3$ of hydrogen per hour, which can meet the needs of large-scale catalytic hydrogenation. However, this technology requires high energy consumption per unit of hydrogen production, which directly limits the economics of hydrogen utilization and deep conversion.

In the production of LSF, the catalytic performance of a catalyst determines the degree of deep development of this technology. At present, many authorized or published patents and articles on alkaline water electrolysis catalysts still stay in the research of laboratory conditions (1 M KOH, room temperature), and there is no disclosure fully involving the operating conditions of industrial alkaline water electrolysis equipment (5.5 M to 6 M KOH, 60° C. to 90° C.). Therefore, the development of low-cost, high-efficiency and stable electrocatalytic materials suitable for actual industrial operating conditions has very high engineering application values. In addition, nickel-iron catalytic materials reported in patents and articles are generally prepared as follows: with external nickel-iron compounds and other raw materials as reactants, allowing a nickel-iron material to grow on a substrate through a high-temperature hydrothermal or electrochemical process (CN201810044072, CN201711203589, and CN201611122593). However, these preparation methods require various raw materials, complex processes, and high energy consumption, and are difficult to achieve large-scale industrial preparation.

SUMMARY

The present disclosure has the following innovation: based on a surface-modified nickel substrate, under mild low-temperature conditions, the soluble iron salt is used as the only reactant to prepare a new high-activity nickel-iron catalytic material suitable for industrial high-temperature and strong-alkali production conditions. Compared with the current industrial alkaline water electrolysis catalyst materials, the nickel-iron catalytic material can effectively reduce the energy consumption per unit hydrogen production in the water electrolysis stage, and can work stably for a long time under operating conditions, thereby greatly improving the energy efficiency of hydrogen production through water electrolysis and the production rate of methanol fuel produced using solar energy in the entire LSF production process.

The present disclosure is intended to provide a nickel-iron catalytic material, a preparation method therefor, and use thereof in the hydrogen production through water electrolysis and the LSF production. The key technical point of the present disclosure is as follows. Given the current large-scale industrial alkaline water electrolysis conditions for hydrogen production, a new high-activity nickel-iron catalytic material is prepared under simple and mild conditions, and then used in a water electrolysis and LSF production process, thereby significantly reducing the energy consumption of hydrogen production through water electrolysis and improving the solar energy conversion efficiency of the whole process. The preparation of the novel water splitting catalyst is realized on a modified nickel substrate.

The nickel-iron catalytic material includes a nickel metal substrate, and a catalytically-active layer that includes iron with a valence of >+3 and non-zero valent nickel.

Preferably, the catalytically-active layer may be attached to a surface of the nickel metal substrate.

Optionally, the nickel metal substrate may be at least one selected from the group consisting of nickel sheet, nickel wire mesh, nickel foam, and nickel powder.

Optionally, a molar ratio of iron to nickel in the catalytically-active layer may be Fe/Ni=(2–50):100. Preferably, an upper limit of the molar ratio of iron to nickel may be selected from the group consisting of 1:2, 2:5, 3:10, and 1:5, and a lower limit of the molar ratio of iron to nickel may be selected from the group consisting of 1:10, 1:20, and 1:50.

Optionally, a molar ratio of iron to nickel in the catalytically-active layer may be Fe/Ni=(7–18):100. Preferably, an upper limit of the molar ratio of iron to nickel may be selected from the group consisting of 9:50, 4:25, and 7:50, and a lower limit of the molar ratio of iron to nickel may be selected from the group consisting of 3:25, 1:10, and 7:100.

Optionally, the catalytically-active layer may have a thickness of 300 nm to 500 nm.

The apparent morphology of the nickel substrate does not change significantly after the iron is introduced and the nickel-iron material is formed, and no obvious nano-morphology/particle is formed on the surface of the nickel substrate.

According to another aspect of the present disclosure, a preparation method of the nickel-iron catalytic material is provided, including at least the following steps: statically soaking the nickel metal substrate in a solution with iron ions, and washing and drying the nickel metal substrate to obtain the nickel-iron catalytic material.

Preferably, the preparation method of the nickel-iron catalytic material may include at least the following steps:
(1) treating the nickel metal substrate in a hydrogen-containing atmosphere to obtain a nickel metal substrate precursor; and
(2) statically soaking the nickel metal substrate precursor in a solution with iron ions, and washing and drying the nickel metal substrate precursor to obtain the nickel-iron catalytic material.

Optionally, the hydrogen-containing atmosphere in step (1) may include an inert gas.

Hydrogen or a mixed gas of hydrogen and an inert gas can be used in the present disclosure. Those skilled in the art can select a suitable hydrogen-containing atmosphere according to actual needs. Preferably, the hydrogen-containing atmosphere may be a mixed gas of hydrogen and an inert gas, and a volume ratio of the hydrogen to the inert gas may be (1–50):100.

Preferably, an upper limit of the volume ratio of the hydrogen to the inert gas may be selected from the group consisting of 1:2, 2:5, and 3:10, and a lower limit of the volume ratio of the hydrogen to the inert gas may be selected from the group consisting of 1:5, 1:10, and 1:100.

Optionally, the inert gas may be at least one selected from the group consisting of nitrogen, helium, neon, argon, and xenon.

Optionally, step (1) may include: treating the nickel metal substrate for 0.25 h to 6 h in the hydrogen-containing atmosphere at 100° C. to 400° C.

Optionally, step (1) may include: treating the nickel metal substrate for 1 h to 3 h in the hydrogen-containing atmosphere at 200° C. to 300° C.

Optionally, in the solution with iron ions in step (2), the iron ions may have a concentration of 1 mM to 15 mM.

Optionally, in the solution with iron ions in step (2), the iron ions may have a concentration of 3 mM to 12 mM.

Optionally, in the solution with iron ions in step (2), the iron ions may have a concentration of 5 mM to 10 mM.

Optionally, in the solution with iron ions in step (2), the iron ions may be $Fe^{2+}$ and/or $Fe^{3+}$.

Optionally, the solution with iron ions in step (2) may include at least one selected from the group consisting of iron nitrate, iron chloride, and iron sulfate.

Preferably, the solution with iron ions in step (2) may be subjected to an inert gas sparging treatment before use.

Optionally, the statically soaking in step (2) may be conducted at 20° C. to 70° C. for 0.5 h to 20 h.

Optionally, the statically soaking in step (2) may be conducted at 30° C. to 60° C. for 2 h to 10 h.

Optionally, the statically soaking in step (2) may be conducted at 40° C. to 50° C. for 3 h to 6 h According to another aspect of the present disclosure, a use of the nickel-iron catalytic material described above and a nickel-iron catalytic material prepared by the preparation method described above in the catalysis of a water splitting and oxygen evolution reaction in an alkaline solution is provided.

According to another aspect of the present disclosure, a method for producing hydrogen and/or oxygen through water electrolysis is provided, including the following: placing an anode and a cathode in an alkaline electrolyte, and conducting the water electrolysis to produce hydrogen and/or oxygen, where
the anode includes an anode catalyst, and the anode catalyst is at least one selected from the group consisting of the nickel-iron catalytic material described above and a nickel-iron catalytic material prepared by the preparation method described above; and
the cathode includes a cathode catalyst, and the cathode catalyst is at least one selected from the group consisting of nickel and an alloy formed of nickel with at least one selected from the group consisting of molybdenum, tungsten, iron, and platinum.

Optionally, the alkaline electrolyte may include at least one alkali metal hydroxide.

Optionally, the alkaline electrolyte may include at least one selected from the group consisting of sodium hydroxide, potassium hydroxide, and lithium hydroxide.

Optionally, the alkali metal hydroxide in the alkaline electrolyte may have a concentration of 1 mol/L to 6 mol/L.

Optionally, the alkali metal hydroxide in the alkaline electrolyte may have a concentration of 5 mol/L to 6 mol/L.

Optionally, the water electrolysis may be conducted at 25° C. to 90° C.

Optionally, the water electrolysis may be conducted at 60° C. to 90° C.

According to another aspect of the present disclosure, a production method of an LSF is provided, including at least the following steps:
a) using a solar photovoltaic system to convert solar energy into electric energy;
b) using the electric energy obtained in step a) for water electrolysis to prepare hydrogen;
and
c) allowing the hydrogen obtained in step b) to react with carbon dioxide to produce methanol;
where a method used for the water electrolysis in step b) is the method for producing hydrogen and/or oxygen through water electrolysis described above.

In the above method, water is first decomposed using solar energy to produce hydrogen, and then the obtained hydrogen is allowed to react with a carbon-containing compound to prepare a chemical or a fuel, such as reacting with carbon dioxide to prepare methanol. This process can recycle water and carbon dioxide, and makes it easy to long-term store and utilize scattered solar energy. The entire technical process mainly includes the following three systems: (1) solar photovoltaic power generation system, (2) water electrolysis system for hydrogen production, and (3) carbon dioxide hydrogenation system for fuel synthesis. Reaction equations are as follows:

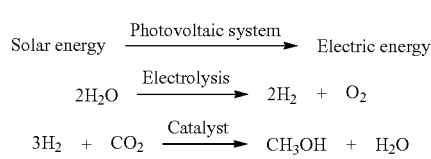

-continued

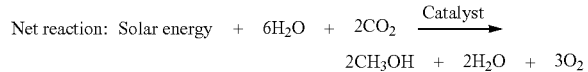

Reactions in the above systems are as follows:
(1) The photovoltaic power generation system receives solar energy to generate electric energy and then drives a water electrolysis device to decompose water, so as to produce hydrogen.
(2) In the water electrolysis device, the nickel-iron catalytic material serves as an anode, and a cathode is at least one selected from the group consisting of nickel and an alloy formed of nickel with at least one from the group consisting of aluminum, molybdenum, tungsten, iron, and platinum. An alkali liquor enters the water electrolysis device through a charging pump for circulation, and a water splitting reaction occurs at the cathode and the anode to generate hydrogen and oxygen, respectively. The produced hydrogen and oxygen enter hydrogen and oxygen separation tanks through different gas channels respectively, thereby effectively avoiding unsafe factors caused by gas mixing.
(3) The hydrogen produced by the water electrolysis device is mixed with carbon dioxide in a gas mixing tank at a desired ratio, and then a mixed gas enters a reaction tower after the pressure is raised to a desired value by a booster compressor, where the mixed gas undergoes a reaction under the action of the carbon dioxide hydrogenation catalyst to generate products such as methanol; the products enter a separation tank through a condenser, such that the liquid product (methanol and water) is condensed and stored in the separation tank; and unconverted and unreacted gases (carbon dioxide, hydrogen, and carbon monoxide) enter the mixing tank through the booster compressor and then enter the reaction tower once again to be utilized and converted.

Finally, through the photovoltaic power generation system, the water electrolysis system, and the carbon dioxide hydrogenation system, solar irradiation energy is converted into hydrogen and liquid methanol.

Solar photovoltaic systems capable of converting solar energy into electric energy in the art can all be used in the technical solutions of the present disclosure. Optionally, the solar photovoltaic system in step a) may be at least one selected from the group consisting of a silicon-based photovoltaic system, a gallium arsenide photovoltaic system, a cadmium telluride photovoltaic system, and a copper indium gallium selenide photovoltaic system.

The processes, devices, and catalysts in the art for methanol production through a reaction of hydrogen with carbon dioxide can be used in the technical solutions of the present disclosure. Optionally, a catalyst for methanol production through a reaction of hydrogen with carbon dioxide in step c) may be at least one selected from the group consisting of $CuOZnOAL_2O_3$, $ZnOZrO_2$, $In_2O_3ZrO_2$, $CdOZrO_2$, $ZnOCr_2O_3$, $In_2O_3Cr_2O_3$, and $CdOCr_2O_3$.

Advantages of the Present Disclosure:
1) When the nickel-iron catalytic material of the present disclosure adopts nickel mesh as the substrate, in a strong-alkali and high-temperature industrial alkaline water splitting system (30% potassium hydroxide, 80° C.), only a reaction overpotential of 180 mV is required to achieve a current density of 10 mA cm$^{-2}$, which is much lower than the overpotential (440 mV) of the commercial Ir/C catalyst and the overpotential (240 mV) of the commercial nickel mesh catalyst. When the nickel-iron mesh catalytic material is used instead of the commercial nickel mesh to drive a water splitting reaction in an electrolytic tank with Raney nickel as a cathode, a working voltage of the system at a current density of 250 mA cm$^{-2}$ can be reduced by 162 mV, and the energy consumption per m$^3$ of hydrogen production can be reduced by 0.39 KW h$^{-1}$. Moreover, the nickel-iron mesh catalytic material can work stably for a long time without deactivation.
2) The nickel-iron catalytic material of the present disclosure can be used for water splitting by renewable solar energy to produce hydrogen, and the obtained hydrogen is allowed to react with carbon dioxide to produce methanol. The whole process realizes the conversion from solar energy to methanol, which further promotes the conversion and utilization of renewable energy. The hydrogen production through water electrolysis using renewable energy realizes the recycling of carbon resources.
3) When the industrial alkaline water electrolysis device assembled with the new nickel-iron mesh anode catalyst and the commercial Raney nickel cathode catalyst are used in a production process of an LSF, an output of methanol from solar energy can be increased by about 9%, with high stability. The method involves mild reaction conditions and simple synthesis process, is conducive to the large-scale and scale-up production, and has promising application prospects.

DETAILED DESCRIPTION OF THE EMBODIMENTS

The present disclosure will be further described below through specific examples, and the examples are merely exemplary rather than restrictive. Unless otherwise specified, the raw materials in the examples are all commercially purchased and are directly used without special treatment; and the test devices adopt parameters recommended by the manufacturers.

In the process of the examples, the solar power generation device used has a power generation capacity of Q=10 MW, and is coupled with an alkaline water electrolysis device for hydrogen production and a carbon dioxide hydrogenation device. The carbon dioxide hydrogenation device adopts a ZnOZrO$_2$ catalyst and conducts a reaction at 5 MPa, 330° C., and gas hourly space velocity (GHSV) of 24,000 mL h$^{-1}$ g$^{-1}$, with a carbon dioxide conversion rate of 11% and a methanol selectivity of 80%. According to calculation by the reaction equation

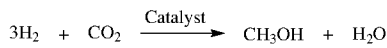

and the ideal-gas equation, under standard conditions, each m$^3$ of H$_2$ can convert about 0.03 m$^3$ of CO$_2$ into methanol in a single cycle. In addition, under the conditions of 30% KOH and 80° C., a commercially-available alkaline water electrolysis device for hydrogen production (which is obtained by the assembly of 280 electrolysis cells and the diameter of the working area is 1.6 m) needs to consume P kWh per m$^3$ of hydrogen production. A volume V of CO$_2$ converted per hour by the solar power generation device with a coupled power generation capacity of Q=10 MW can be calculated by the following formula:

$$V = \frac{Q \times 10^3}{P} \times 0.03 \text{ m}^3.$$

In the examples, the commercially-available alkaline water electrolysis device for hydrogen production, the nickel mesh, and the Raney nickel are all purchased from Suzhou Jingli Hydrogen Production Equipment Co., Ltd.

In the examples, the three-electrode test is conducted at the INTERFACE 5000 electrochemical workstation of Garmy Instruments Inc.

In the examples, the morphology and surface element analysis of a sample is conducted by a Quanta 200 FEG scanning electron microscope with an energy spectrum.

In the examples, the XPS analysis of the sample is conducted by a VG ESCALAB MK2 X-ray energy spectrometer.

Comparative Example 1

The nickel mesh and Raney nickel used in a commercially-available alkaline water electrolysis industrial device respectively served as a cathode and an anode to test the water electrolysis performance under strong alkali and high temperature (30% KOH, 80° C.), which was a basic reference comparative example.

(1) A 60-mesh Raney nickel cathode catalyst for commercially-available alkaline water electrolysis industrial devices was soaked in a 1 M NaOH solution for 24 h, then rinsed with deionized water until a resulting washing liquid was neutral, and dried at room temperature.

(2) A 60-mesh nickel mesh anode catalyst for commercially-available alkaline water electrolysis industrial devices was used directly and denoted as sample D1$^{\#}$.

Figure 1:
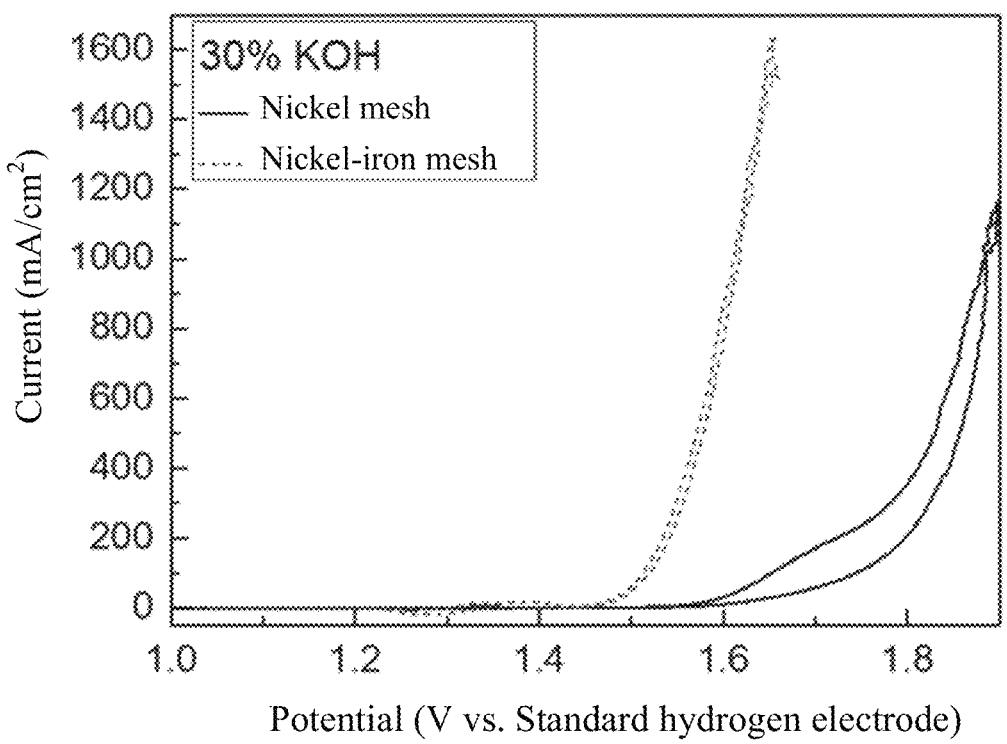
FIG. 1 shows performance test curves of sample D1$^\#$ in Comparative Example 1 and sample 1$^\#$ in Example 1 under three-electrode conditions.

(3) In a three-electrode system, Raney nickel was used as a counter electrode to test the water oxidation activity of the sample D1$^{\#}$, and results were shown in FIG. 1 (under strong alkali: 30% KOH, at room temperature). The initial overpotential for oxygen evolution was 270 mV, and an overpotential of 650 mV was required to reach a current density of 1000 mA·cm$^{-2}$.

Figure 2:
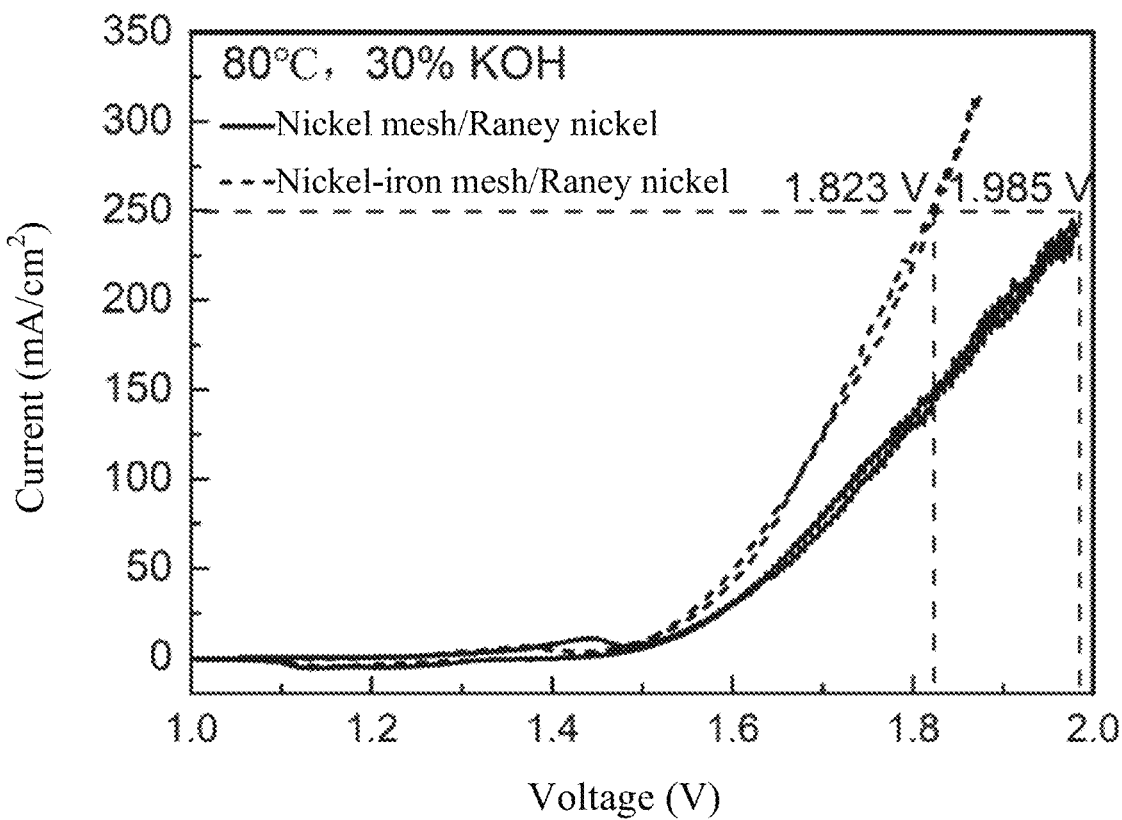
FIG. 2 shows water splitting performance curves of sample D1$^\#$ in Comparative Example 1 and sample 1$^\#$ in Example 1 that separately are assembled with a Raney nickel cathode catalytic material to form a two-electrode electrolysis cell.

(4) The sample D1$^{\#}$ as an anode and Raney nickel as a cathode were assembled into an alkaline water electrolysis device for hydrogen production, and a working curve of an electrolysis cell (under strong alkali: 30% KOH, at high temperature: 80° C.) was determined. Results were shown in FIG. 2. A single electrolysis cell required a voltage of 1.985 V to achieve a current density of 250 mA·cm$^{-2}$.

(5) When a commercially-available alkaline water electrolysis device for hydrogen production used the Raney nickel and the nickel mesh as cathode/anode, the energy consumption per m$^3$ of hydrogen production was about 4.4 kWh.

Example 1

A new nickel-iron anode catalyst was prepared with a commercially-available nickel mesh as a substrate, and a commercially-available Raney nickel was used as a cathode to conduct water electrolysis under strong alkali and high temperature (30% KOH, 80° C.).

(1) A 60-mesh Raney nickel cathode catalyst for commercially-available alkaline water electrolysis industrial devices was soaked in a 1 M NaOH solution for 24 h, then rinsed with deionized water until a resulting washing liquid was neutral, and dried at room temperature.

(2) Preparation of a nickel-iron mesh anode catalyst (2-1) A 60-mesh nickel mesh for commercially-available alkaline water electrolysis industrial devices was placed in a tube furnace, incubated at 400° C. for 5 h in a stable atmosphere with a mixed gas of hydrogen and argon at a volume ratio of 1:10, and then cooled to room temperature to obtain a nickel mesh substrate with a specific surface species.

(2-2) Preparation of a reaction solution: Iron (III) chloride was dissolved in water to obtain a transparent solution of 10 mmol/L.

(2-3) Low-temperature chemical bath: The nickel mesh with the specific surface species obtained in step (2-1) was statically soaked in the stable reaction solution obtained in step (2-2) at 50° C. for 6 h.

(2-4) Rinsing of electrode sheet: The nickel mesh obtained in (2-3) was taken out, thoroughly washed with a large amount of water, and blow-dried or naturally air-dried to obtain the nickel-iron mesh catalyst, which was denoted as sample 1$^{\#}$. The morphological characterization was conducted through SEM on sample 1$^{\#}$, and the elemental composition of the nickel-iron oxide active layer was determined through energy dispersive X-ray spectroscopy (EDS). Results showed that, in sample 1$^{\#}$, the nickel-iron oxide active layer had a thickness of about 300 nm to 500 nm and an atomic ratio of about Fe/Ni=(10–15):100.

(3) In a three-electrode system, Raney nickel was used as a counter electrode to test the water oxidation activity of the sample 1$^{\#}$ anode (under strong alkali: 30% KOH, at room temperature), and results were shown in FIG. 1. The initial overpotential for oxygen evolution of the sample 1$^{\#}$ was 134 mV, and an overpotential of 380 mV was only required to reach a current density of 1,000 mA·cm$^2$. Compared with sample D1$^\#$ in Comparative Example 1, the initial overpotential for oxygen evolution was reduced by 136 mV, and the overpotential required at a current density of 1,000 mA·cm$^{-2}$ was reduced by 270 m V.

Figure 3:
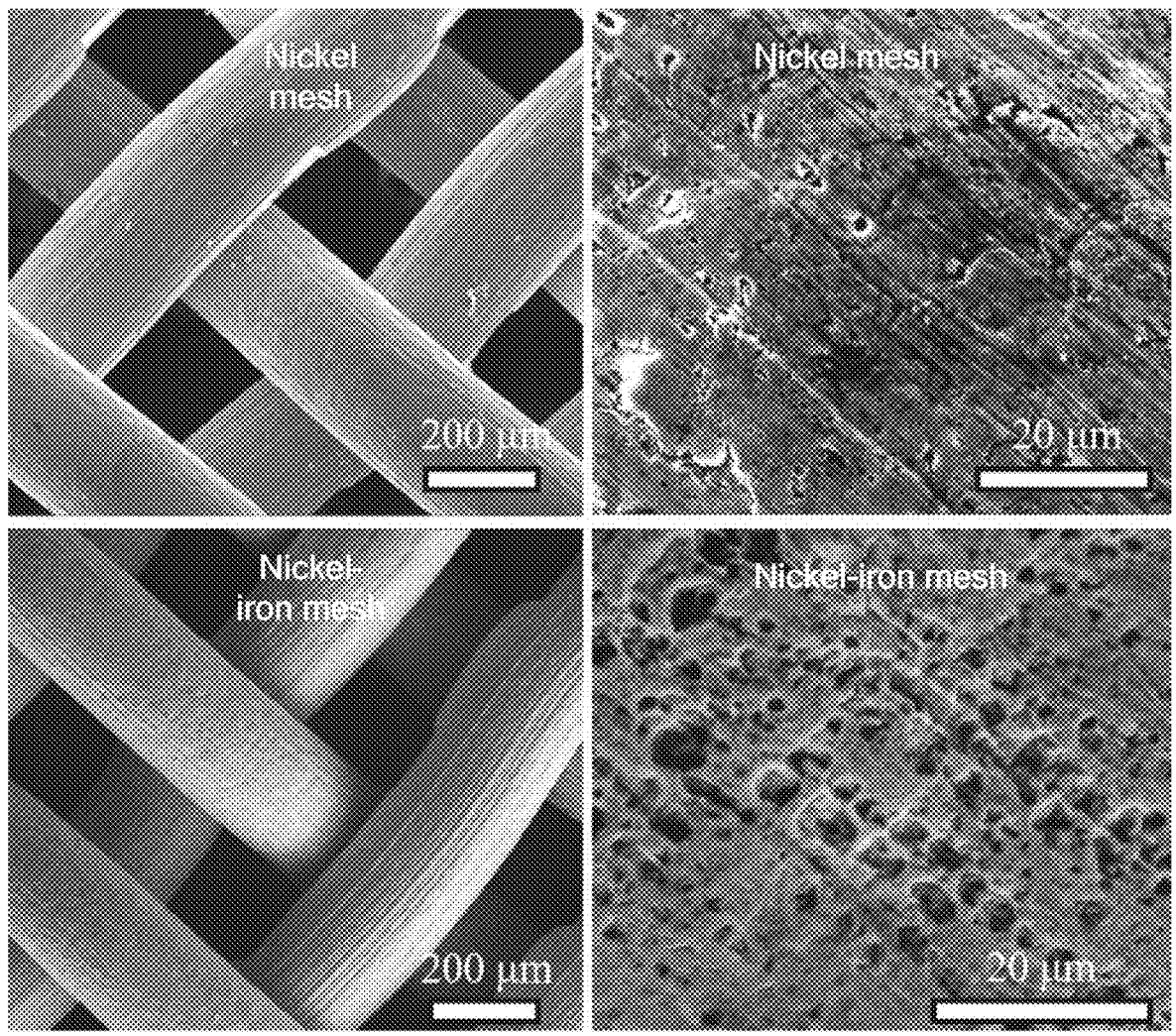
FIG. 3 shows the comparison of scanning electron microscopy (SEM) images of sample 1$^\#$ in Example 1 and a nickel substrate.
Figure 4:
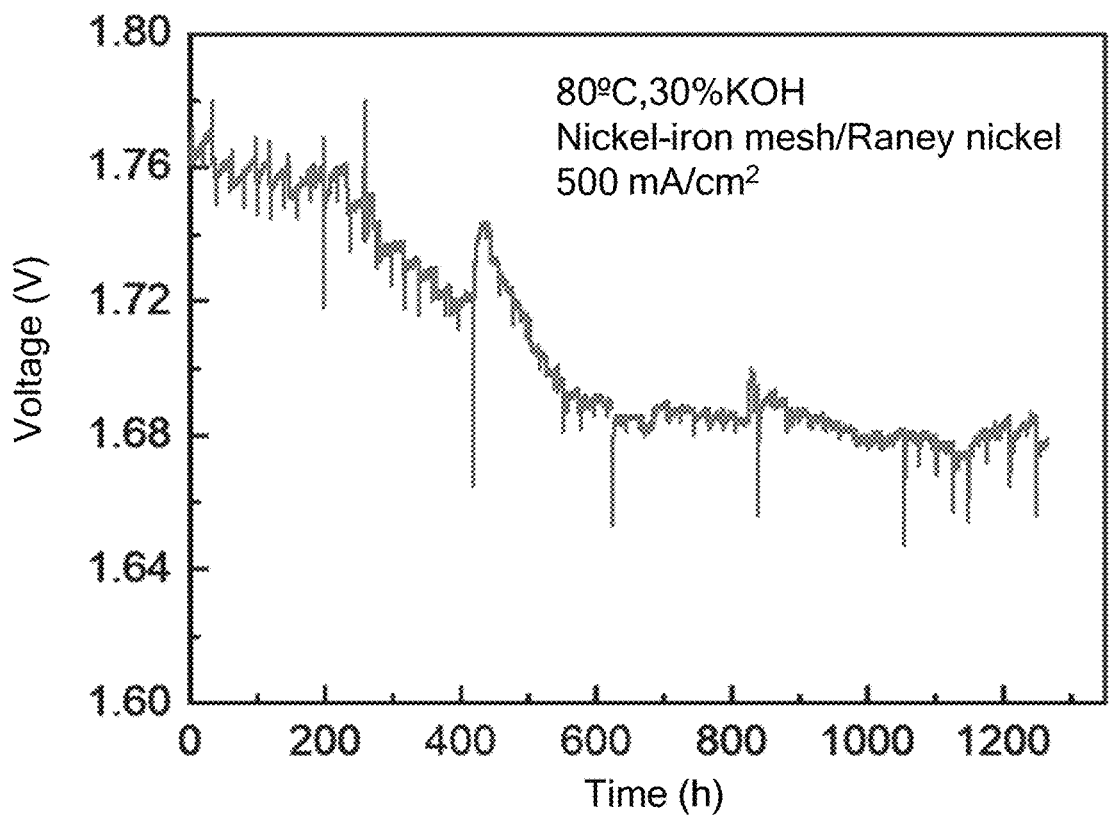
FIG. 4 shows a stability working curve of a two-electrode electrolysis cell assembled by sample 1$^\#$ in Example 1 with the Raney nickel cathode catalytic material.

(4) The sample 1$^\#$ as an anode and Raney nickel as a cathode were assembled into an alkaline water electrolysis device for hydrogen production, and a working curve of an electrolysis cell (under strong alkali: 30% KOH, at high temperature: 80° C.) was determined. Results were shown in FIG. 2. The comparison of SEM images of sample 1$^\#$ and the nickel substrate in this example was shown in FIG. 3, and it indicates that, after the reaction was completed, the apparent morphology of the substrate did not change significantly. A single electrolysis cell required a voltage as low as 1.823 V to achieve a current density of 250 mA·cm$^{-2}$. The electrolysis device for hydrogen production assembled by sample 1$^\#$ and Raney nickel still exhibited high working stability at a high current density of 500 mA·cm$^2$, as shown in FIG. 4. Compared with sample D1$^\#$ in Comparative Example 1, the new nickel-iron mesh catalyst of the present disclosure made the energy consumption per unit hydrogen production of the entire alkaline water electrolysis device reduced by about ΔP=0.39 kWh.

(5) According to the calculation based on the above data, with the process and the new nickel-iron mesh catalyst, each 10 MW photovoltaic device could convert about 75 m$^3$ of CO$_2$ into methanol per hour. Compared with Comparative Example 1, the conversion of carbon dioxide per hour could be increased by 9.7%. Results were shown in Table I below.

with a large amount of water, and blow-dried or naturally air-dried to obtain the nickel-iron mesh catalyst, which was denoted as sample 2$^\#$. The morphological characterization was conducted through SEM on sample 2$^\#$, and the elemental composition of the nickel-iron oxide active layer was determined through EDS. Results showed that, in sample 2$^\#$, the nickel-iron oxide active layer had a thickness of about 100 nm to 200 nm and an atomic ratio of about Fe/Ni=(8–12):100.

Figure 5:
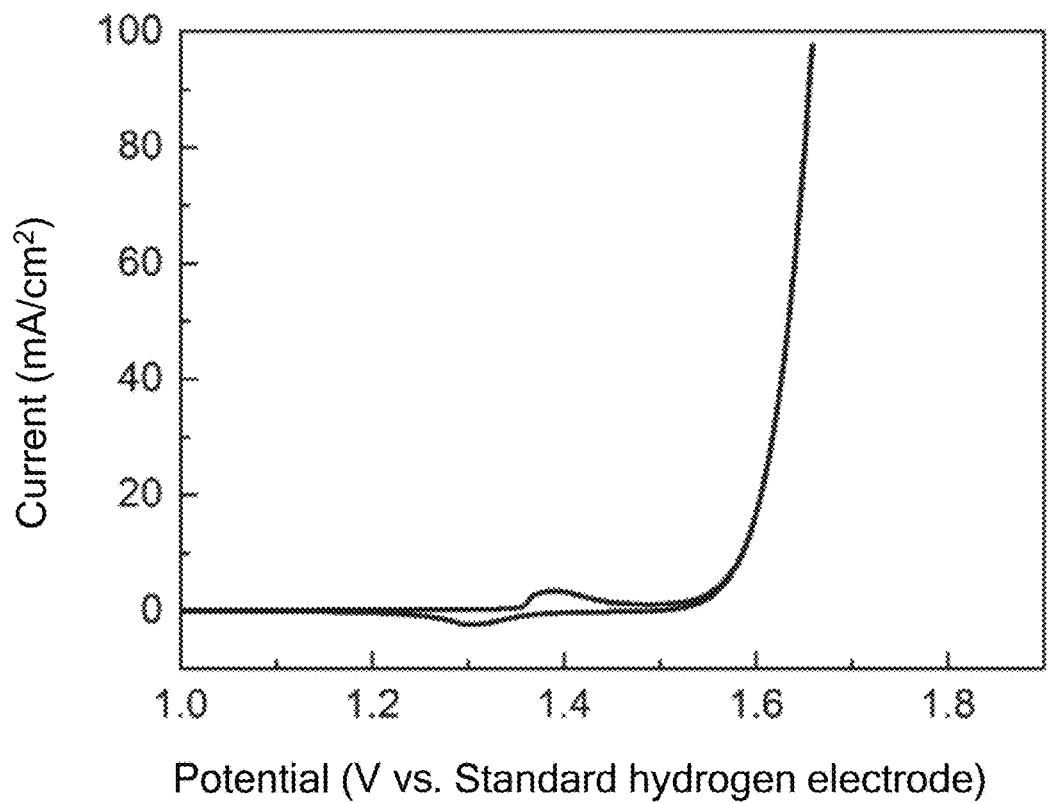
FIG. 5 shows a performance test curve of sample 2$^\#$ in Example 2 under three-electrode conditions.

(2) In a three-electrode system, Raney nickel was used as a counter electrode to test the water oxidation activity of the sample 2$^\#$ anode (under strong alkali: 30% KOH, at room temperature), and results were shown in FIG. 5. The initial overpotential for oxygen evolution of sample 2$^\#$ was 310 mV, which was increased by 176 mV compared with that of sample 1$^\#$, and an overpotential of 380 mV could only achieve a current density of 25 mA·cm$^{-2}$.

It was confirmed that the nickel-iron anode catalyst growing on the metal nickel substrate without surface species modification could not exhibit prominent catalytic activity on water splitting and oxygen evolution.

Example 3

Iron was introduced at an increased temperature to prepare a nickel-iron catalyst, as a comparative example.

(1) Preparation of a nickel-iron mesh anode catalyst (1-1) A 60-mesh nickel mesh for commercially-available alkaline water electrolysis industrial devices was placed in a tube furnace, incubated at 400° C. for 5 h in a stable atmosphere with a mixed gas of hydrogen and argon at a volume ratio of 1:10, and then cooled to room temperature to obtain a nickel mesh substrate with a specific surface species.

(1-2) Preparation of a reaction solution: Iron (III) chloride was dissolved in water to obtain a transparent solution of 10 mmol/L.

(1-3) Low-temperature chemical bath: A 60-mesh nickel mesh for commercially-available alkaline water electrolysis industrial devices was statically soaked in the stable reaction solution obtained in step (1-2) at 85° C. for 6 h.

(1-4) Rinsing of electrode sheet: The nickel mesh obtained in (1-3) was taken out, thoroughly washed with a large amount of water, and blow-dried or naturally air-dried to obtain the nickel-iron mesh catalyst, which was denoted as sample 3$^\#$. The morphological characterization was conducted through SEM on

TABLE 1

CO$_2$ conversion in the example and Comparative Example 1 (standard conditions)

| Anode catalyst | Photovoltaic power | Water electrolysis | | | | Energy consumption per m$^3$ of hydrogen production (KWh) | Carbon dioxide hydrogenation Catalyst ZnOZrO$_2$ | | CO$_2$ conversion per hour |
|---|---|---|---|---|---|---|---|---|---|
| | | Anode | Cathode | Medium | Temperature | | Pressure | Temperature | |
| Sample D1# | 10 MW h$^{-1}$ | Nickel mesh | Raney nickel | 30% KOH | 80° C. | 4.4 | 5 MPa | 330° C. | 68 m$^3$ |
| Sample 1# | 10 MW h$^{-1}$ | Nickel-iron mesh | Raney nickel | 30% KOH | 80° C. | 4.01 | 5 MPa | 330° C. | 75 m$^3$ |

Example 2

The nickel metal substrate was not subjected to surface species modification, and iron was directly introduced to prepare a nickel-iron catalyst, as a comparative example.

(1) Preparation of a nickel-iron mesh anode catalyst (1-1) Preparation of a reaction solution: Iron (III) chloride was dissolved in water to obtain a transparent solution of 10 mmol/L.

(1-2) Low-temperature chemical bath: A 60-mesh nickel mesh for commercially-available alkaline water electrolysis industrial devices was statically soaked in the stable reaction solution obtained in step (1-1) at 50° C. for 6 h.

(1-3) Rinsing of electrode sheet: The nickel mesh obtained in (1-2) was taken out, thoroughly washed sample 3#, and the elemental composition of the nickel-iron oxide active layer was determined through energy dispersive X-ray spectroscopy (EDS). Results showed that, in sample 3#, the nickel-iron oxide active layer had a thickness of about 1000 nm to 1200 nm and an atomic ratio of about Fe/Ni=(15-18):100.

Figure 6:
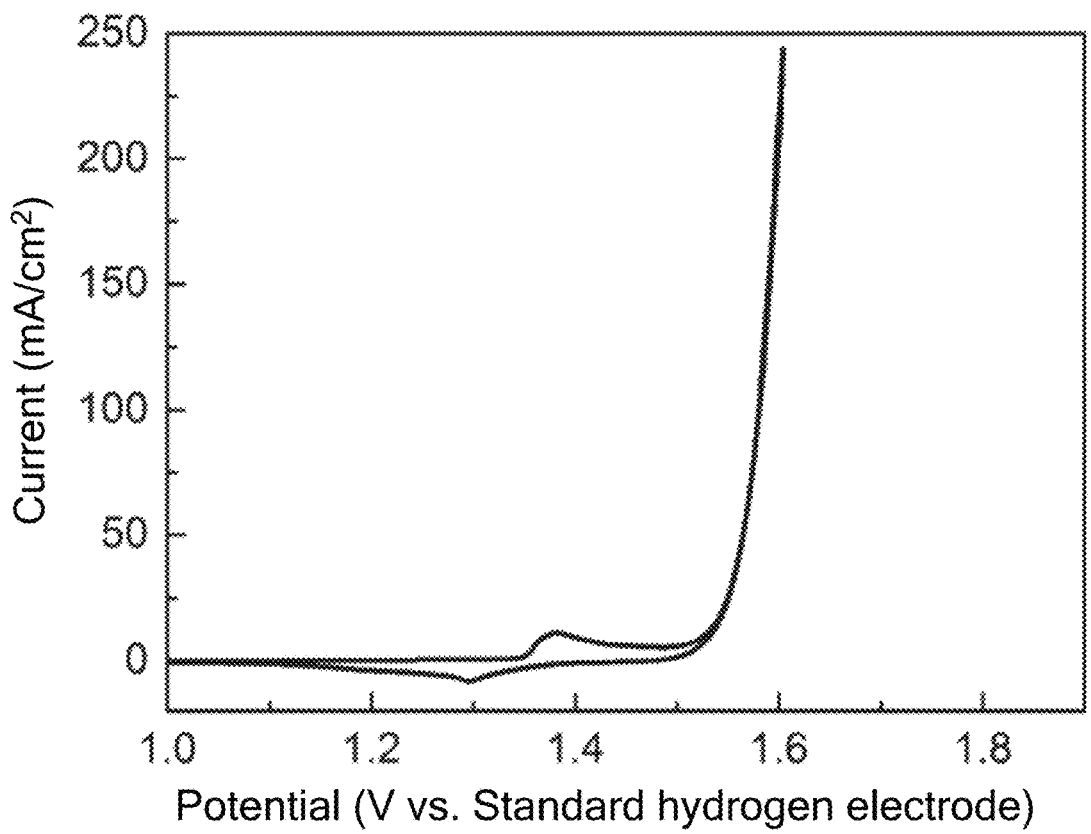
FIG. 6 shows a performance test curve of sample 3$^\#$ in Example 3 under three-electrode conditions.

(2) In a three-electrode system, Raney nickel was used as a counter electrode to test the water oxidation activity of the sample 3 # anode (under strong alkali: 30% KOH, at room temperature), and results were shown in FIG. 6. The initial overpotential for oxygen evolution of sample 3# was 270 mV, which was increased by 136 mV compared with that of sample 1#, and an overpotential of 380 mV could only achieve a current density of 210 mA·cm$^{-2}$. However, the performance was better than that of sample 2# in Example 2 where the metal nickel substrate was not subjected to surface species modification.

Example 4

The reaction and sample preparation were conducted with a ferrous salt solution.

(1) Preparation of a nickel-iron mesh anode catalyst (1-1) A 60-mesh nickel mesh for commercially-available alkaline water electrolysis industrial devices was placed in a tube furnace, incubated at 400° C. for 5 h in a stable atmosphere with a mixed gas of hydrogen and argon at a volume ratio of 1:10, and then cooled to room temperature to obtain a nickel mesh substrate with a specific surface species.

(1-2) Preparation of a reaction solution: Iron (II) chloride was dissolved in water to obtain a transparent solution of 10 mmol/L.

(1-3) Low-temperature chemical bath: A 60-mesh nickel mesh for commercially-available alkaline water electrolysis industrial devices was statically soaked in the stable reaction solution obtained in step (1-2) at 50° C. for 6 h.

(1-4) Rinsing of electrode sheet: The nickel mesh obtained in (1-3) was taken out, thoroughly washed with a large amount of water, and blow-dried or naturally air-dried to obtain the nickel-iron mesh catalyst, which was denoted as sample 4#. The morphological characterization was conducted through SEM on sample 4#, and the elemental composition of the nickel-iron oxide active layer was determined through energy dispersive X-ray spectroscopy (EDS). Results showed that, in sample 4#, the nickel-iron oxide active layer had a thickness of about 200 nm to 300 nm and an atomic ratio of about Fe/Ni=(7-10):100.

Figure 7:
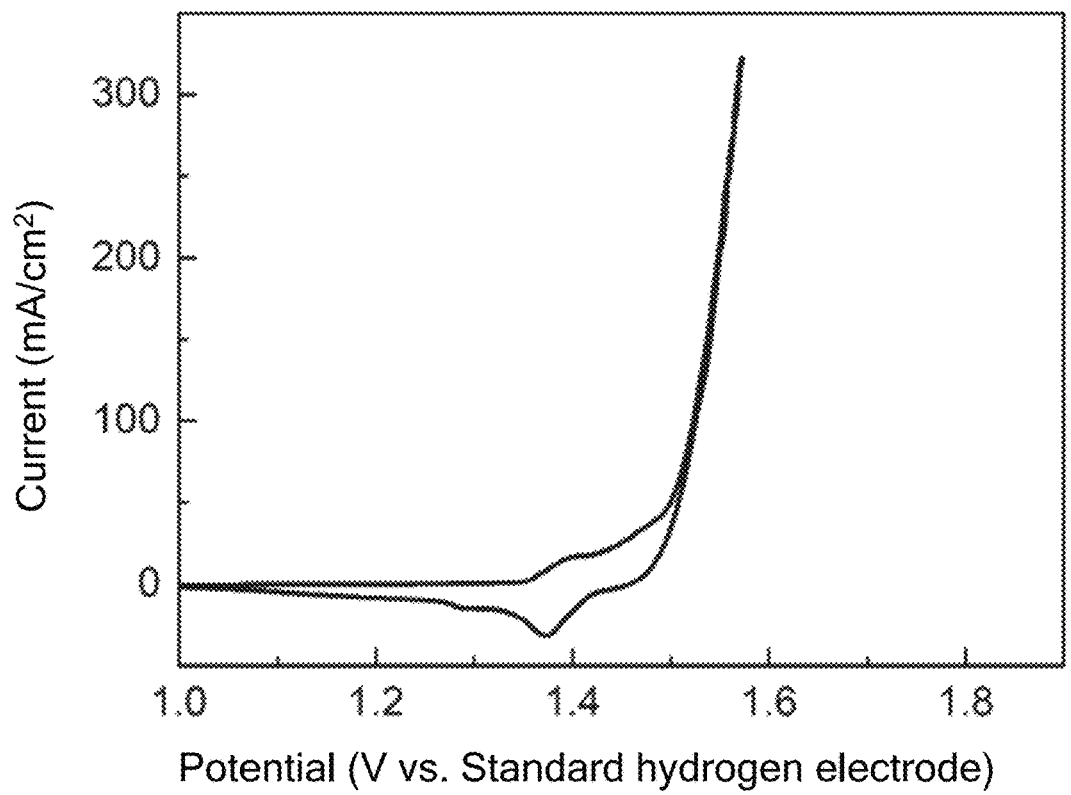
FIG. 7 shows a performance test curve of sample 4$^\#$ in Example 4 under three-electrode conditions.

(2) In a three-electrode system, Raney nickel was used as a counter electrode to test the water oxidation activity of the sample 4# anode (under strong alkali: 30% KOH, at room temperature), and results were shown in FIG. 7. The initial overpotential for oxygen evolution of the sample 4# was 230 mV, and an overpotential of 330 mV was only required to realize a current density of 300 mA cm$^{-2}$. Compared with sample D1# in Comparative Example 1, the initial overpotential for oxygen evolution was reduced by 40 m V.

Figure 8:
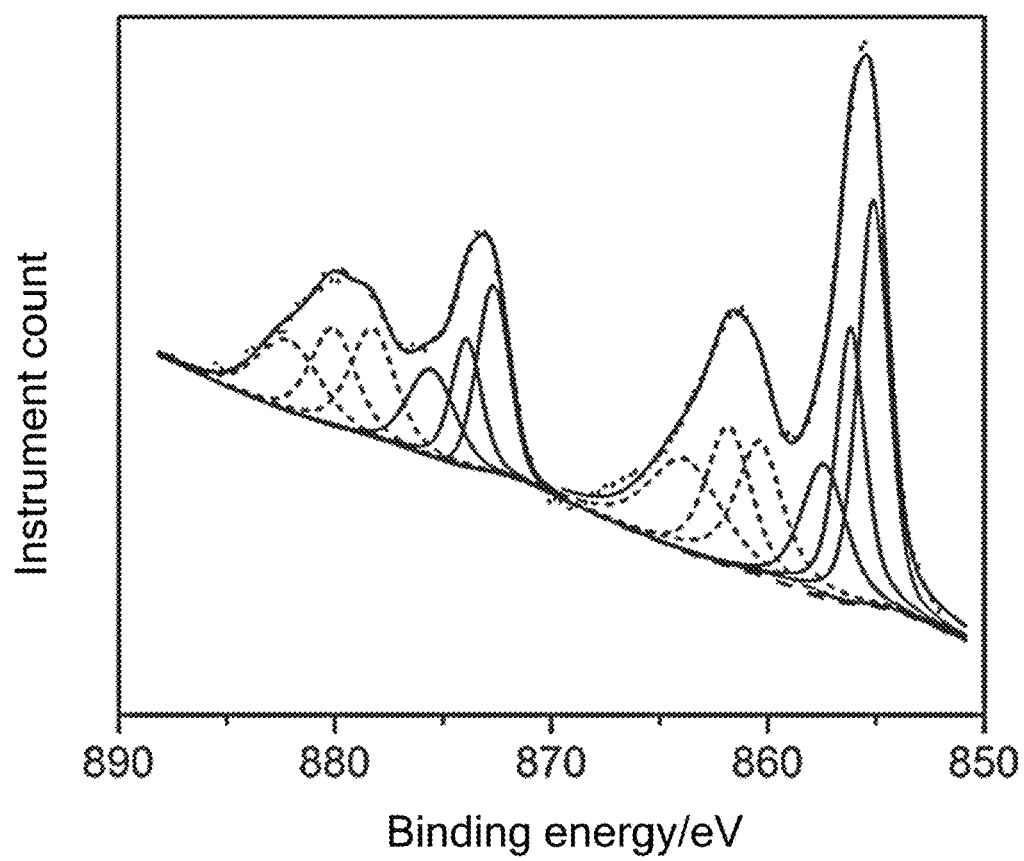
FIG. 8 shows an X-ray photoelectron spectroscopy (XPS) Ni2p spectrum of nickel in the catalytically-active layer of sample 1$^\#$ in Example 1.
Figure 9:
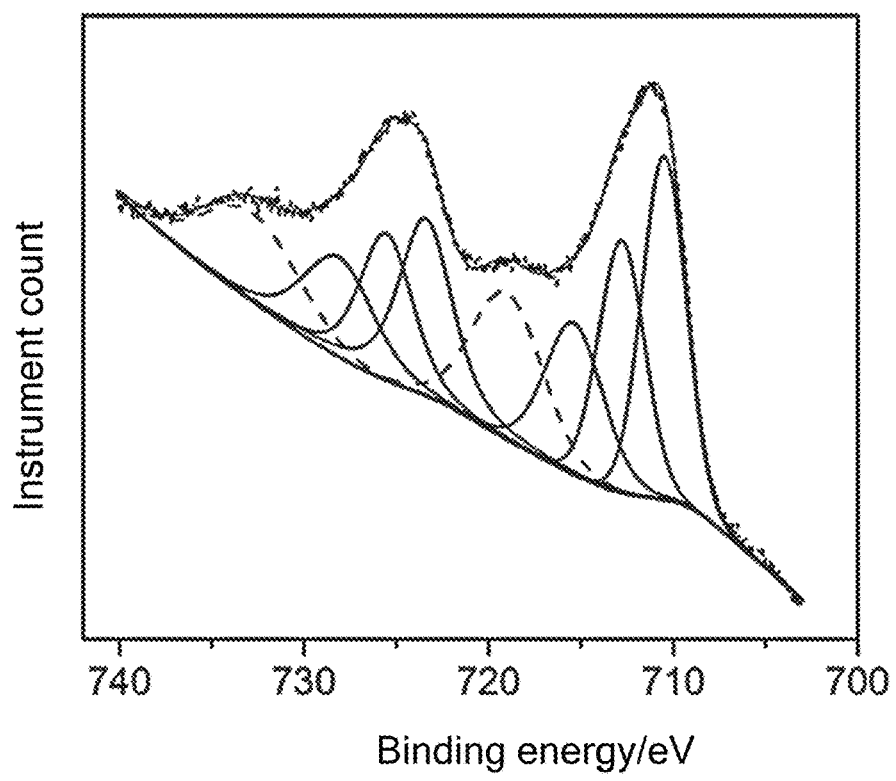
FIG. 9 shows an XPS Fe2p spectrum of iron in the catalytically-active layer of sample 1 $^\#$ in Example 1.

Example 5 Characterization Results of Iron and Nickel in the Catalytically-Active Layer FIG. 8 shows an XPS Ni2p spectrum of nickel in the catalytically-active layer of sample 1# in Example 1, and FIG. 9 shows an XPS Fe2p spectrum of iron in the catalytically-active layer of sample 1# in Example 1. The characterization results showed that the catalytically-active layer included iron with a valence of +2, +3, and >+3; and the catalytically-active layer included nickel with a valence of +2 and +3, which existed in the form of NiO, Ni(OH)$_2$, and NiOOH. Although the catalyst was on the metal nickel substrate, there was no zero-valent nickel signal according to the XPS data.

The above examples are merely a few examples of the present disclosure, and do not limit the present disclosure in any form. Although the present disclosure is disclosed as above with preferred examples, the present disclosure is not limited thereto. Some changes or modifications made by any technical personnel familiar with the profession using the technical content disclosed above without departing from the scope of the technical solutions of the present disclosure are equivalent to equivalent implementation cases and fall within the scope of the technical solutions.

What is claimed is:

1. A preparation method of a nickel-iron catalytic material, comprising at least the following steps:
   statically soaking a nickel metal substrate in a solution with iron ions, and washing and drying the nickel metal substrate to obtain the nickel-iron catalytic material, wherein
   the nickel metal substrate is treated for 0.25 h to 6 h in a hydrogen-containing atmosphere at 100° C. to 400° C., and then soaked in the solution with the iron ions;
   in the solution with iron ions, the iron ions are $Fe^{2+}$ and/or $Fe^{3+}$;
   in the solution with iron ions, the iron ions have a concentration of 1 mM to 15 mM;
   the statically soaking is conducted at 20° C. to 70° C. for 0.5 h to 20 h;
   wherein the nickel-iron catalytic material is configured for producing hydrogen and/or oxygen through water electrolysis.

2. The preparation method according to claim 1, wherein the hydrogen-containing atmosphere comprises an inert gas; and
   the inert gas is at least one selected from the group consisting of nitrogen, helium, neon, argon, and xenon.

3. The preparation method according to claim 1, wherein the nickel metal substrate is treated for 1 h to 3 h in the hydrogen-containing atmosphere at 200° C. to 300° C.

4. The preparation method according to claim 1, wherein in the solution with iron ions, the iron ions have a concentration of 3 mM to 12 mM.

5. The preparation method according to claim 1, wherein in the solution with iron ions, the iron ions have a concentration of 5 mM to 10 mM.

6. The preparation method according to claim 1, wherein the solution with iron ions is subjected to an inert gas sparging treatment before use.

7. The preparation method according to claim 1, wherein the statically soaking is conducted at 30° C. to 60° C. for 2 h to 10 h.

8. The preparation method according to claim 1, wherein the statically soaking is conducted at 40° C. to 50° C. for 3 h to 6 h.

* * * * *